United States Patent
Fujie

(10) Patent No.: US 7,561,889 B2
(45) Date of Patent: Jul. 14, 2009

(54) ALARM APPARATUS AND ITS METHOD FOR PRODUCING A USE PROHIBITION ALARM BY INTERCEPTING AND DISCRIMINATING A MOBILE SIGNAL OF COMMUNICATION SYSTEM PRESCRIBED IN ITS MOBILE PHONE

(75) Inventor: Hidekatu Fujie, Osaka (JP)

(73) Assignee: Funai Electric Co., Ltd. (JP)

( * ) Notice: Subject to any disclaimer, the term of this patent is extended or adjusted under 35 U.S.C. 154(b) by 674 days.

(21) Appl. No.: 11/007,309

(22) Filed: Dec. 9, 2004

(65) Prior Publication Data

US 2005/0130679 A1 Jun. 16, 2005

(30) Foreign Application Priority Data

Dec. 12, 2003 (JP) .............................. 2003-414956

(51) Int. Cl.
*G06F 15/16* (2006.01)
(52) U.S. Cl. .................................... 455/456.6; 455/567
(58) Field of Classification Search ................ 455/410, 455/411, 456.1, 457, 456.6, 567
See application file for complete search history.

(56) References Cited

U.S. PATENT DOCUMENTS 6,932,699 B2 * 8/2005 Ueda et al. ..................... 463/9

2004/0162124 A1 * 8/2004 Barton ........................... 463/1
2005/0130679 A1 * 6/2005 Fujie ....................... 455/456.6

FOREIGN PATENT DOCUMENTS

| JP | 10-042371 | 2/1998 |
|---|---|---|
| JP | 11-331061 | 11/1999 |
| JP | 2001-028618 | 1/2001 |
| JP | 2002-095053 | 3/2002 |
| JP | 2002-291036 | 10/2002 |

* cited by examiner

*Primary Examiner*—Sam Bhattacharya
(74) *Attorney, Agent, or Firm*—Bacon & Thomas, PLLC

(57) ABSTRACT

In a mobile network communication between a base station 2 producing a control signal Sa within an administration area 2-1 and at least one mobile phone 1 having a kind of communication system, an alarm apparatus 3 is used for producing a use prohibition alarm, when the one mobile phone is present within a use prohibition area 3-1, to its user. The alarm apparatus 3 and its method of the present invention are for intercepting the control signal within the administration area 2-1 and comprises system discriminating means 3-2 for discriminating the kind of communication system from a response signal Sb and/or a positioning signal Sc from the mobile phone 1 to produce a discriminated communication system information indicative of the kind of communication system of the mobile phone 1. In accordance with the discriminated communication system information, said use prohibition alarm is produced.

4 Claims, 3 Drawing Sheets

FIG.2A 36-1

TO A USER OF FOMA ™ :

PLEASE SWITCH OFF THE POWER OF
THE MOBILE PHONE AROUND HERE

FIG.2B 36-1

TO A USER OF FOMA ™ :

IMMEDIATELY SWITCH OFF THE POWER
OF THE MOBILE PHONE CAUSING RADIO
INTERFERENCE

ALARM APPARATUS AND ITS METHOD FOR PRODUCING A USE PROHIBITION ALARM BY INTERCEPTING AND DISCRIMINATING A MOBILE SIGNAL OF COMMUNICATION SYSTEM PRESCRIBED IN ITS MOBILE PHONE

BACKGROUND OF THE INVENTION

1. Field of the Invention

The present invention relates to an alarm apparatus, in particularly, an alarm apparatus and its method which is used in a mobile communication network between a base station and at least one mobile phone movable inside a use prohibition area from an outside area thereof.

2. Prior Art

In a matter which will later be described in details, such an alarm apparatus and its method as to a user of its mobile phone in a use prohibition area are already known upon laying open of the following patent documents. As a first prior art apparatus, a patent document No. 1 is disclosed in Japanese Patent application, Unexamined Prepublication (A) Kokai No. JP1999-331061A entitled "Use Prohibition Alarm System of Mobile Phone". According to this first prior art apparatus, when a user with a mobile phone kept in a power-on mode is present inside the use prohibition area, an alarm sound indicative of a prohibition to the user is generated. In order to achieve such an alarm apparatus, a shield pass for shielding a down signal from a base station is provided with an entrance of the use prohibition area. When the user moves inside the use prohibition area through an exit of the shield pass, a dummy base station generates a quasi-down signal for sending the mobile phone, so that the mobile phone receives the quasi-down signal and generates an up signal for carrying out a positioning registration operation. Inasmuch as a receiver for detecting the up signal is provided with the exit of the shield pass, a speaker broadcast an alarm.

Furthermore, a patent document No. 2 is disclosed in Japanese Patent application, Unexamined Prepublication (A) Kokai No. JP2002-95053A entitled "Use Administration System of Mobile Phone". According to this second prior art apparatus, an electric wave shield pass is provided as an intrusion pass for entering a use prohibition area. In the intrusion pass, the second prior art apparatus comprises a transmission unit for transmitting a control signal to an intruded mobile phone, a reception unit for a response signal from an intruded mobile phone, and an alarm unit for producing an alarm indicative of "Switch off" when the reception unit is receives the response signal. As a result, it prevents the user from forgetting to set in a switching-off mode of the mobile phone.

Likewise, a patent document No. 3 is disclosed in Japanese Patent application, Unexamined Prepublication (A) Kokai No. JP2001-28618A entitled "Use Alarm Apparatus for Mobile Phone". According to this third prior art apparatus, an electric wave from a mobile phone is detected by both a parent detector and a plurality of child detectors equipped within a use prohibition area monitored by an administrator. Both a user of the mobile phone and the administrator receive an alarm.

As for the first prior art apparatus, the intrusion pass and the dummy base station are provided therewith, so that a large-scale equipment is needed.

Also, as for the second prior art apparatus, the transmission unit, the reception unit, and the alarm unit are provided therewith, so that a large-scale equipment is needed.

Furthermore, in the third prior art apparatus, when a lot of mobile phones are entered therein, it is difficult for such users to find out who is alarmed, in such a case that any of the users judges not to be alarmed and ignores the alarm at worst. Therefore, it is disadvantageous in that the alarm apparatus cannot inform the users of use prohibition area of the mobile phones, so that the alarm apparatus is of no use.

SUMMARY OF THE INVENTION

It is consequently an object of the present invention to provide an alarm apparatus and its method without large-scale equipment, an alarm being not ignored with an effective use.

Other objects of the present invention will become clear as the description proceeds.

According to the first aspect of the present invention, there is provided with an alarm apparatus (3) which is used for intercepting a mobile signal generated from a mobile phone (1) and is equipped within a use prohibition area (3-1) under an environment of a mobile network communication between a base station area (2) and said mobile phone, said base station area producing a control signal (Sa) reachable to said mobile phone within an administration area (2-1), said mobile signal including both a response signal (Sb) in response to said control signal and a positioning signal (Sc) indicative of a present position of said mobile phone (1) with a kind of communication system prescribed, said alarm apparatus for producing a use prohibition alarm to a user of said mobile phone when said mobile phone is present within said use prohibition area, said alarm apparatus comprising: receiving means (30-1) disposed within said use prohibition area to receive said response signal and/or said positioning signal; system discriminating means (30-2) for discriminating said communication system from said response signal and/or said positioning signal to produce a communication system information indicative of said kind of communication system of said mobile phone; and alarm producing means (30-3) for specifying said kind of communication system and producing said use prohibition alarm in correspondence to said communication system information; wherein said system discriminating means comprises a processing section (34) for counting the receiving times number, in such a way that a level judgment signal is produced so as to be indicative of judging whether or not the receiving times number is less than a predetermined value; and an alarm control section (35) for controlling to produce an alarm control signal indicative of a first use prohibition alarm signal if said level judgment signal is indicative of being less than said predetermined value, otherwise to produce another control signal indicative of a second use prohibition alarm signal.

In accordance with the first aspect of the present invention, the alarm apparatus has no structure as to an alternation of the mobile phone and the base station, so that no special equipment is added thereto.

Furthermore, the kind of communication system prescribed in the mobile phone is discriminated, so that an alarm is generated and transmitted towards each mobile phone having the common kind of communication system.

As a result, it is possible to provide an alarm apparatus having no large-scale equipment, an alarm being not ignored with an effective use.

Incidentally, the alarm apparatus can alarm with the kinds of communication system information discriminated, together with each use status of each mobile phone entered within the prohibition area.

According to the second aspect of the present invention, there is provided with an alarm apparatus as in the first aspect thereof, wherein said system discriminating means produce a plurality of discriminated kinds of communication system information when said receiving means receive a plurality of kinds of communication system information; and wherein said alarm producing means perform each use prohibition alarm in correspondence with each discriminated kind of communication system information.

In accordance with the second aspect of the present invention, the alarm apparatus can alarm so as to be in correspondence to each use prohibition alarm indicative of two kinds of use status as to each mobile phone entered within the use prohibition area. Therefore, the following setting is available. One of the use prohibition alarm is not stimulant and serves as an information for quitting the use of the mobile phone because of regarding as an inadvertent use, but another use prohibition alarm serves as a stimulant for complaining of using the mobile phone to the user within the use prohibition area.

According to the third aspect of the present invention, there is provided an alarm apparatus (3) which is used for intercepting a mobile signal generated from a mobile phone (1) and is equipped within a use prohibition area (3-1) under an environment of a mobile network communication between a base station area (2) and said mobile phone, said base station area producing a control signal (Sa) reachable to said mobile phone within an administration area (2-1), said mobile signal including both a response signal (Sb) in response to said control signal and a positioning signal (Sc) indicative of a present position of said mobile phone (1) with a kind of communication system prescribed, said alarm apparatus for producing a use prohibition alarm to a user of said mobile phone when said mobile phone is present within said use prohibition area, said alarm apparatus comprising: receiving means (30-1) disposed within said use prohibition area to receive said response signal and/or said positioning signal; system discriminating means (30-2) for discriminating said communication system from said response signal and/or said positioning signal to produce a discriminated communication system information indicative of said kind of communication system of said mobile phone; and alarm producing means (30-3) for specifying said kind of communication system and producing said use prohibition alarm in correspondence to said discriminated communication system information.

In accordance with the third aspect of the present invention, the alarm apparatus has no structure as to an alternation of the mobile phone and the base station, so that no special equipment is added thereto.

Furthermore, the kind of communication system prescribed in the mobile phone is discriminated, so that an alarm is generated and transmitted towards each mobile phone having the common kind of communication system.

As a result, it is possible to provide an alarm apparatus having no large-scale equipment, an alarm being not ignored with an effective use.

According to the fourth aspect of the present invention, there is provided with an alarm apparatus as in the third aspect of the present invention, wherein said system discriminating means produces a plurality of discriminated kinds of communication system information when said receiving means receive a plurality of kinds of communication systems; and wherein said alarm producing means perform each use prohibition alarm in correspondence with each discriminated kind of communication system information.

In accordance with the fourth aspect of the present invention, the system discriminating means produce a plurality of discriminated kinds of communication system information even if a plurality of mobile phones have various kinds of communication systems in power-on mode within the use prohibition area. A plurality of discriminated kinds of communication system information is thus produced to a plurality of mobile phones having various kinds of communication system in power-on mode within the prohibition area. As a result, all of the plurality of mobile phones can receive each discriminated kind of communication system information and can be completely alarmed by producing the use prohibition alarm irrespectively of the kinds of communication system.

According to the fifth aspect of the present invention, there is provided with an alarm apparatus as in third aspect thereof, wherein said system discriminating means comprises system discriminating section (33) for producing a plurality of discriminated kinds of communication system information when said receiving means receive a plurality of kinds of communication system; and wherein said alarm producing means perform each use prohibition alarm in correspondence with each discriminated kind of communication system information.

In accordance with the fifth aspect of the present invention, the alarm apparatus can alarm with the kinds of communication system information discriminated, together with each use status of each mobile phone entered within the use prohibition area.

According to the sixth aspect of the present invention, there is provided with a method for using an alarm apparatus (3) which is used for intercepting a mobile signal generated from a mobile phone (1) and is equipped within a use prohibition area (3-1) under an environment of a mobile network communication between a base station area (2) and said mobile phone, said base station area producing a control signal (Sa) reachable to said mobile phone within an administration area (2-1), said mobile signal including both a response signal (Sb) in response to said control signal and a positioning signal (Sc) indicative of a present position of said mobile phone (1) with a kind of communication system prescribed, said method for producing a use prohibition alarm to a user of said mobile phone when said mobile phone is present within said use prohibition area, said method comprising: a receiving process (S1) within said use prohibition area to receive said response signal and/or said positioning signal; a system discriminating process (S3, S4, S5, S8, S9, and S10) for discriminating said communication system from said response signal and/or said positioning signal to produce a communication system information indicative of said kind of communication system of said mobile phone; and an alarm producing process (S6) for specifying said kind of communication system and producing said use prohibition alarm in correspondence to said communication system information; wherein said system discriminating process comprises a processing step (S8) for counting the receiving times number, in such a way that a level judgment signal is produced so as to be indicative of judging whether or not the receiving times number is less than a predetermined value; and an alarm control step (S4 and S9) for controlling to produce an alarm control signal indicative of a first use prohibition alarm signal if said level judgment signal is indicative of being less than said predetermined value, otherwise to produce another control signal indicative of a second use prohibition alarm signal.

In accordance with the sixth aspect of the present invention, the alarm apparatus used for the method has no structure as to an alternation of the mobile phone and the base station, so that no special equipment is added thereto.

Furthermore, the kind of communication system prescribed in the mobile phone is discriminated, so that an alarm is generated and transmitted towards each mobile phone having the common kind of communication system.

As a result, it is possible to provide a method for using an alarm apparatus having no large-scale equipment, an alarm being not ignored with an effective use.

Incidentally, the method for using the alarm apparatus can alarm with the kinds of communication system information discriminated, together with each use status of each mobile phone entered within the prohibition area.

The alarm apparatus used for the method can alarm with the kinds of communication system information discriminated, together with each use status of each mobile phone entered within the prohibition area.

According to the seventh aspect of the present invention, there is provided with a method as claimed in the sixth aspect of the present invention, wherein said system discriminating process comprises a step for producing a plurality of discriminated kinds of communication system information when said receiving process comprises a step for receiving a plurality of kinds of communication system information; and wherein said alarm producing process comprises a step (S4 and S9) for performing each use prohibition alarm in correspondence with each discriminated kind of communication system information.

In accordance with the seventh aspect of the present invention, the alarm apparatus used for the method can alarm in correspondence to each prohibition alarm that is two kinds of use status as to each mobile phone entered within the use prohibition area. Therefore, the following setting is available. One of the use prohibition alarms is not stimulant and serves as an information for quitting the use of the mobile phone because of regarding as an inadvertent use, but another use prohibition alarm serves as a stimulant for complaining of using the mobile phone to the user within the use prohibition area.

According to the eighth aspect of the present invention, there is provided with a method for using an alarm apparatus (3) which is used for intercepting a mobile signal generated from a mobile phone (1) and is equipped within a use prohibition area (3-1) under an environment of a mobile network communication between a base station area (2) and said mobile phone, said base station area producing a control signal (Sa) reachable to said mobile phone within an administration area (2-1), said mobile signal including both a response signal (Sb) in response to said control signal and a positioning signal (Sc) indicative of a present position of said mobile phone (1) with a kind of communication system prescribed, said method for producing a use prohibition alarm to a user of said mobile phone when said mobile phone is present within said use prohibition area, said method comprising: a receiving process (S1) within said use prohibition area to receive said response signal and/or said positioning signal; a system discriminating process (S3,S5,S8, and S10) for discriminating said communication system from said response signal and/or said positioning signal to produce a discriminated communication system information indicative of said kind of communication system of said mobile phone; and an alarm producing process (S4 and S9) for specifying said kind of communication system and producing said use prohibition alarm in correspondence to said discriminated communication system information.

In accordance with the eighth aspect of the present invention, the alarm apparatus used for the method has no structure as to an alternation of the mobile phone and the base station, so that no special equipment is added thereto.

Furthermore, the kind of communication system prescribed in the mobile phone is discriminated, so that an alarm is generated and transmitted towards each mobile phone having the kind of communication system.

As a result, it is possible to provide an alarm apparatus used for the method having no large-scale equipment, an alarm being not ignored with an effective use.

According to the ninth aspect of the present invention, there is provided with a method as in the eighth aspect of the present invention, wherein said system discriminating process comprises a system discriminating step (S3) for producing a plurality of discriminated kinds of communication system information when said receiving process comprises a step for receiving a plurality of kinds of communication system; and wherein said alarm producing process comprises a step for performing each use prohibition alarm in correspondence with each discriminated kind of communication system information.

In accordance with the ninth aspect of the present invention, in the system discriminating process, a plurality of discriminated kinds of communication system information is produced even if a plurality of mobile phones have a various kinds of communication system in power-on mode within the use prohibition area. A plurality of discriminated kinds of communication system information is thus produced to a plurality of mobile phones having a various kinds of communication system in power-on mode within the prohibition area. As a result, all of the plurality of mobile phones can receive each discriminated kind of communication system information and can be completely alarmed by producing the use prohibition alarm irrespectively of the kinds of communication system.

According to the tenth aspect of the present invention, there is provided with a method as in the ninth aspect of the present invention, wherein said system discriminating process further comprises; a processing step (S8) for counting the receiving times number, in such a way that a level judgment signal is produced so as to be indicative of judging whether or not the receiving times number is less than a predetermined value; and an alarm control step (S4 and S10) for controlling to produce an alarm control signal indicative of a first use prohibition alarm signal if said level judgment signal is indicative of being less than said predetermined value, otherwise to produce another control signal indicative of a second use prohibition alarm signal.

In accordance with the tenth aspect of the present invention, the alarm apparatus used for the method can alarm with the kinds of communication system information discriminated, together with each use status of each mobile phone entered within the prohibition area.

BRIEF DESCRIPTION OF THE DRAWING

FIG. 2A shows an example of a display screen upon a display section of a mobile phone;

FIG. 2B is another example of the display screen upon the display section of the mobile phone.

DESCRIPTION OF THE PREFERRED EMBODIMENT

Figure 1A:
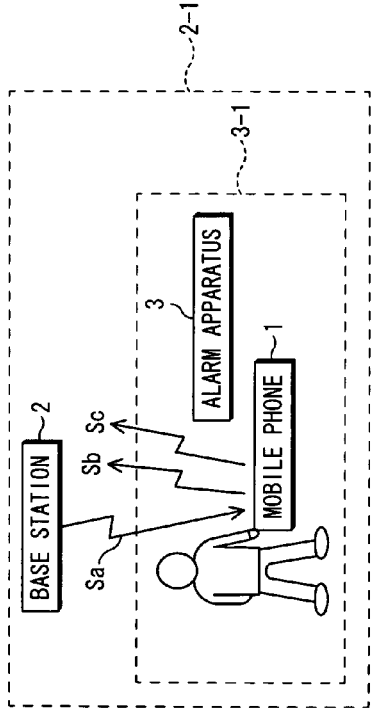
FIG. 1A shows a schematic view of an alarm apparatus and its circumference which is used for a mobile communication network according to one embodiment of the present invention.

FIG. 1A shows a schematic view of an alarm apparatus and its circumference which is used for a mobile communication network.

As best shown in FIG. 1, an alarm apparatus of a preferred embodiment according to the present invention is illustrated by reference numeral 3 and is used for being equipped within a use prohibition area 3-1 or building in a mobile communication network between a base station 2 and at least one mobile phone 1. The alarm apparatus 3 produces a use prohibition alarm (which will later be described) to a user of the mobile phone 1 when the mobile phone 1 is present within the use prohibition area 3-1.

The base station 2 produces a control signal Sa reachable to the mobile phone 1 within an administration area 2-1. The mobile signal of the mobile phone 1 includes both a response signal Sb in response to the control signal Sa and a positioning signal Sc indicative of a present position of the mobile phone 1. When the mobile phone 1 is present within the use prohibition area 3-1, the base station 2 receives the response signal Sb, so that an administration signal indicative of the mobile phone present within the administration area 2-1 is produced. The administration signal is transmitted and registered to a centered office (not shown) for supervising each mobile phone. Incidentally, even unless the mobile phone 1 is in a phone call mode, the control signal Sa and the response signal Sb are produced and exchanged at a predetermined interval.

In such a mobile phone 1, a plurality of kinds of communication systems such as FOMA (Freedom Of Mobile Multimedia Access; a registered trademark and a registered service mark in Japan), CDMA (Code Division Multiple Access), and so on are prescribed so as to be used in an eight hundred GHz frequency area, an 1.5 GH frequency area, and so on.

Figure 1B:
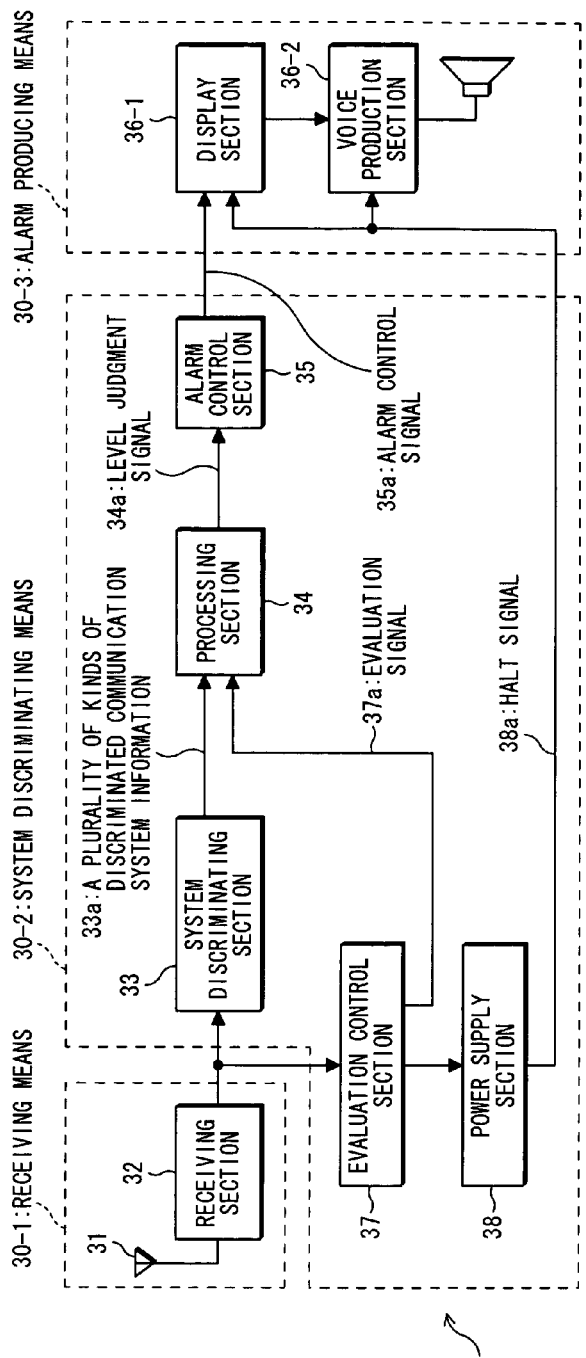
FIG. 1B exemplifies a block diagram of an alarm apparatus depicted in FIG. 1A.

FIG. 1B exemplifies a block diagram of the alarm apparatus 3 depicted in FIG. 1A.

In order to intercept the mobile signal generated from the mobile phone 1, the alarm apparatus 3 comprises receiving means 30-1 disposed within the use prohibition area 3-1 to receive the response signal Sb and/or the positioning signal Sc, system discriminating means 30-2 for discriminating the communication system from the response signal Sb and/or the positioning signal Sc to produce a discriminated communication system information indicative of the kind of communication system of the mobile phone 1, and alarm producing means 30-3 for specifying the kind of communication system and producing the use prohibition alarm in correspondence to the discriminated communication system information.

More specifically, the receiving means 30-1 is provided with an antenna 31 and a receiving section 32, in such a way that a receiving sensibility for an electric field intensity is set so as to be able to receive the response signal Sb and/or the positioning signal Sc. The system discriminating means 30-2 comprises a system discriminating section 33 for producing a plurality of discriminated kinds of communication system information even when the receiving means 32 receive a plurality of kinds of communication system. The alarm producing means 30-3 perform each use prohibition alarm in correspondence with each discriminated kind of communication system information.

The system discriminating means 30-2 further comprises a processing section 34 for counting the receiving times number, in such a way that a level judgment signal is produced so as to be indicative of judging whether or not the receiving times number is less than a predetermined value and an alarm control section 35 for controlling to produce an alarm control signal 35a indicative of a first use prohibition alarm signal if the level judgment signal is indicative of being less than the predetermined value, otherwise to produce another control signal indicative of a second use prohibition alarm signal.

FIG. 2A shows an example of a screen upon a display section 36-1 of a mobile phone 1. FIG. 2B is another example of the screen upon the display section 36-1 of the mobile phone 1.

The alarm producing means 30-3 is provided with a display section 36-1 for displaying a predetermined alarm statement and a voice pronunciation section 36-2 for pronouncing a voice indicative of a predetermined alarm content. Each of the display section 36-1 and the voice pronunciation section 36-2 includes a nonvolatile memory for storing the predetermined alarm statement or the voice.

On the basis of the alarm control signal 35a outputted from the alarm control section 35, a use prohibition statement to FOMA users is displayed as the first use prohibition alarm signal upon the display screen as depicted FIG. 2A. This is because the receiving times number of the same communication system is counted by means of the processing section 34, so that a level judgment signal 34a is produced so as to be indicative of being judged as the receiving times number less than a predetermined value. The level judgment signal 34a is delivered into the alarm control section 35. The first use prohibition alarm signal is produced as a non-strict alarm for asking for quitting an inadvertent use of the user. If the level judgment signal 34a is indicative of not being less than the predetermined value, another control signal indicative of a second use prohibition alarm signal is produced as a strict alarm for complaining the user of the mobile phone 1 within the use prohibition area 3-1 in comparison with the first use prohibition signal.

More specifically, the following setting is available. One of the use prohibition alarm is not stimulant and serves as an information for quitting the use of the mobile phone 1 because of regarding as an inadvertent use, but another use prohibition alarm serves as a stimulant for complaining of using the mobile phone 1 to the user within the use prohibition area 3-1.

By the way, the system discriminating means 30-2 still further comprises an evaluation control section 37 for controlling to evaluate and produce an evaluation signal 37a indicative of whether or not the produced alarm signal is effective after the alarm signal is produced and a power supply section 38 for supplying the electric power to the display section 36-1. When the mobile signal is kept upon not being received after a constant time is passed away, the produced alarm is judged to be effective, so that the evaluation signal 37a is produced. The evaluation signal 37a serves as a non-detection signal of the mobile signal.

When the non-detection signal of the evaluation signal 37a is received in the display section 36-1, a statement of "Thank you for cooperation" for switching off the mobile phone(s) 1 is displayed upon the display screen of the display section 36-1. After that, the power supply 38 receives the halt signal 37a and is halted, so that its display screen is switched off.

On the other hand, the voice pronunciation section 36-2 receives the halt signal 38a and the operation for pronunciation of the voice is halted.

Figure 3:
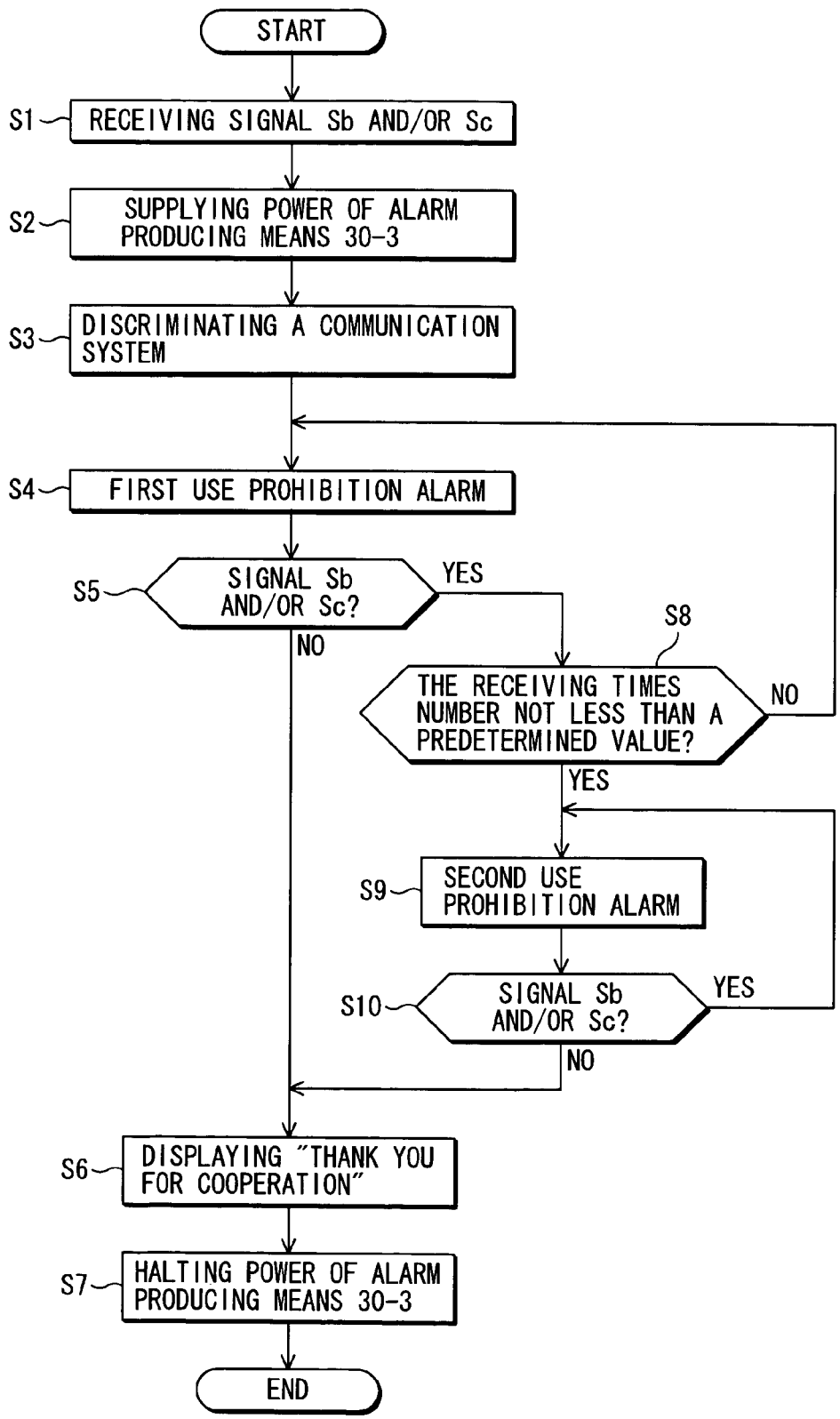
FIG. 3 shows a flow chart for use in describing an operation of the mobile phone as to an alarm method according to one embodiment of the present invention.

FIG. 3 shows a flow chart for use in describing an operation of the mobile phone as to an alarm method according to one embodiment of the present invention.

In operation, the alarm method by using the alarm apparatus 3 comprising a receiving process or step S1 through the antenna 31 within the use prohibition area 3-1 to receive the response signal Sb and/or the positioning signal Sc. Next, in a step S2, the response signal Sb and/or the positioning signal Sc are detected, so that a power on mode is set. And, then, the communication system from the response signal Sb and/or the positioning signal Sc is discriminated to produce a communication system information indicative of the kind of communication system of the mobile phone 1. The system discriminating process comprises a system discriminating step S3 for producing a plurality of discriminated kinds of communication system information when said receiving process comprises a step for receiving a plurality of kinds of communication system. The alarm producing process comprises a step for performing each use prohibition alarm in correspondence with each discriminated kind of communication system information.

In an alarm producing process or step S6, the kind of communication system is specified and the use prohibition alarm is produced so as to be in correspondence to the communication system information.

In a step S5, after the use prohibition alarm is produced for the first time, a constant time is passed away, so that "SIGNAL Sb and/or Sc ?" is negated as to its or their presence and is transferred through "NO" into the step S6. In a processing step S8, when the response signal Sb and/or the positioning signal Sc are received, the receiving times number is counted by the processing section 34. At the same time, a level judgment signal is produced so as to be indicative of judging whether or not the receiving times number is less than a predetermined value. And, in an alarm control step S4, an alarm control signal indicative of a first use prohibition alarm signal of "TO A USER OF FOMA™: PLEASE SWITCH OFF THE POWER OF THE MOBILE PHONE AROUND HERE" depicted in FIG. 2A is controlled and produced if the level judgment signal is indicative of being less than the predetermined value. Otherwise, in another control step S9, another control signal is produced so as to be indicative of a second use prohibition alarm signal "TO A USER OF FOMA™: IMMEDIATELY SWITCH OFF THE POWER OF THE MOBILE PHONE CAUSING RADIO INTERFERENCE" depicted in FIG. 2B. After that, in case that "SIGNAL Sb and/or Sc ?" of a step S10 is affirmed as to its or their presence, the step S10 is transferred into the step S6.

As stated above, the alarm producing process comprises two steps S4 and S9 for performing each use prohibition alarm in correspondence with each discriminated kind of communication system information. In the step S9, the kind of communication system is specified and the second use prohibition alarm is produced so as to be in correspondence to the discriminated communication system information.

In case of kept upon not being receiving the response signal Sb and/or the positioning signal Sc for a constant time, the step S5 and a step S10 are transferred into the step S6.

In the step S6, when the non-detection signal of the evaluation signal 37a is received, the produced alarm judges that the users have just switched off the mobile phones 1, so that a statement of "Thank you for cooperation" for switching off or power-off mode of the mobile phone(s) 1 is displayed upon the display screen of the display section 36-1. After that, in a step S7, the power supply section 38 receives the halt signal 37a and is halted, so that its display screen is switched off. On the other hand, by the halt signal 38a, the operation for pronunciation of the voice of the voice pronunciation section 36-2 is halted.

According to the alarm apparatus 3 and its method of the one embodiment according to the invention, the response signal Sb and/or the positioning signal Sc are intercepted, so that the communication system of the mobile phone 1 is discriminated. The alarm apparatus 3 is only prepared, so that there is no need alternating such a structure as to the mobile phone 1 and the base station, so that no special equipment is added thereto with no cost incurred in conjunction thereto.

Furthermore, the kinds of communication systems prescribed in the mobile phones 1 are discriminated and it is easy for users to judge whether or not the alarm as to the discriminated kind of communication system relates to the self-mobile phone 1 even if there are a plurality of users with mobile phones 1 in power-on mode within the use prohibition area 3-1. In case that there are many users with mobile phones 1 in power-on mode within the use prohibition area 3-1. the content of the use prohibition alarm may be changed into more strict alarm. At the same time, the voice by the voice pronunciation section 36-2 may be changed to serve as a complete alarm.

In addition thereto, each receiving times number in correspondence to each communication system is counted even if a plurality of various kinds of communication systems are mixed. The first use prohibition alarm and the second use alarm are mixed and produced so as to correspond to each communication system.

As a result, it is possible to provide an alarm apparatus and its method having no large-scale equipment, an alarm being not ignored with an effective use.

Repeatedly, the alarm apparatus 3 can alarm with the kinds of communication system information discriminated, together with each use status of each mobile phone 1 entered within the prohibition area 3-1.

In the above-mentioned embodiment, there is a difference between the first use prohibition alarm and the second use prohibition alarm as to a statement and a voice. As for the difference, a use of a various kinds of colors of characters may be made and be displayed upon the display screen of the display section 36-1.

Incidentally, each of the receiving times number for each kind of each communication system may be stored in the processing section 34 and be used as a collected data for statistically every communication system. Therefore, the collected data is available for discriminating violated kinds among a plurality of communication systems prescribed in the mobile phones 1.

While the present invention has thus far been described in specific conjunction with a preferred embodiment thereof, it will now readily be possible for those skilled in the art to put the present invention into practice in various other matters. For example, the present invention is not only applicable to the mobile phone network communication, but also is applicable to ubiquitous circumstances such as a wearable computer with a common communication system as the mobile phone 1.

What is claimed is:

1. An alarm apparatus which is used for intercepting a mobile signal generated from a mobile phone and is equipped within a use prohibition area under an environment of a mobile network communication between a base station area and said mobile phone, said base station area producing a control signal reachable to said mobile phone within an administration area, said mobile signal including both a response signal in response to said control signal and a positioning signal indicative of a present position of said mobile phone with a kind of communication system prescribed, said alarm apparatus for producing a use prohibition alarm to a user of said mobile phone when said mobile phone is present within said use prohibition area, said alarm apparatus comprising:

receiving means disposed within said use prohibition area to receive said response signal and/or said positioning signal;

system discriminating means for discriminating said communication system from said response signal and/or said positioning signal to produce a communication system information indicative of said kind of communication system of said mobile phone; and alarm producing means for specifying said kind of communication system and producing said use prohibition alarm in correspondence to said communication system information;

wherein said system discriminating means comprises a processing section for counting the receiving times number, in such a way that a level judgment signal is produced so as to be indicative of judging whether or not the receiving times number is less than a predetermined value; and an alarm control section for controlling to produce an alarm control signal indicative of a first use prohibition alarm signal if said level judgment signal is indicative of being less than said predetermined value, otherwise to produce another control signal indicative of a second use prohibition alarm signal.

2. An alarm apparatus as claimed in claim 1, wherein said system discriminating means produce a plurality of discriminated kinds of communication system information when said receiving means receive a plurality of kinds of communication system information; and wherein said alarm producing means perform each use prohibition alarm in correspondence of each discriminated kind of communication system information.

3. An alarm method which is used for intercepting a mobile signal generated from a mobile phone and is equipped within a use prohibition area under an environment of a mobile network communication between a base station area and said mobile phone, said base station area producing a control signal reachable to said mobile phone within an administration area, said mobile signal including both a response signal in response to said control signal and a positioning signal indicative of a present position of said mobile phone with a kind of communication system prescribed, said alarm apparatus for producing a use prohibition alarm to a user of said mobile phone when said mobile phone is present within said use prohibition area, said alarm method comprising:

a receiving process within said use prohibition area to receive said response signal and/or said positioning signal;

a system discriminating process for discriminating said communication system from said response signal and/or said positioning signal to produce a communication system information indicative of said kind of communication system of said mobile phone; and an alarm producing process for specifying said kind of communication system and producing said use prohibition alarm in correspondence to said communication system information;

wherein said system discriminating process comprises a processing step for counting the receiving times number, in such a way that a level judgment signal is produced so as to be indicative of judging whether or not the receiving times number is less than a predetermined value; and an alarm control step for controlling to produce an alarm control signal indicative of a first use prohibition alarm signal if said level judgment signal is indicative of being less than said predetermined value, otherwise to produce another control signal indicative of a second use prohibition alarm signal.

4. An alarm method as claimed in claim 3, wherein said system discriminating process comprises a step for producing a plurality of discriminated kinds of communication system information when said receiving process comprises a step for receiving a plurality of kinds of communication system information; and wherein said alarm producing process comprises a step for performing each use prohibition alarm in correspondence of each discriminated kind of communication system information.

* * * * *

UNITED STATES PATENT AND TRADEMARK OFFICE
CERTIFICATE OF CORRECTION

PATENT NO.         : 7,561,889 B2
APPLICATION NO. : 11/007309
DATED               : July 14, 2009
INVENTOR(S)       : Hidekatsu Fujie It is certified that error appears in the above-identified patent and that said Letters Patent is hereby corrected as shown below:

On the title page item (75), the inventor's name should read:

Hidekatsu FUJIE

Signed and Sealed this

Tenth Day of November, 2009

David J. Kappos
*Director of the United States Patent and Trademark Office*